United States Patent [19]

Rau et al.

[54] DISPERSIBLE BERLIN BLUE PIGMENT

[75] Inventors: Axel Rau, Pfullendorf; Klaus-Dieter Franz, Kelkheim, both of Fed. Rep. of Germany

[73] Assignee: Merck Patent Gesellschaft mit beschrankter Haftung, Darmstadt, Fed. Rep. of Germany

[21] Appl. No.: 653,126

[22] Filed: Sep. 21, 1984

[30] Foreign Application Priority Data

Sep. 24, 1983 [DE] Fed. Rep. of Germany ....... 3334596

[51] Int. Cl.$^4$ .............................................. C04B 31/26
[52] U.S. Cl. ................... 106/291; 106/308 B; 106/308 Q; 428/404
[58] Field of Search ................ 106/291, 292, 308 B, 106/308 Q; 428/404, 405

[11] Patent Number: 4,545,821

[45] Date of Patent: Oct. 8, 1985

[56] References Cited

U.S. PATENT DOCUMENTS

| | | | |
|---|---|---|---|
| 3,711,308 | 1/1973 | Dieter et al. | 106/291 |
| 3,951,679 | 4/1976 | Bernhard et al. | 106/291 |
| 4,047,969 | 9/1977 | Armanini et al. | 106/308 B |
| 4,309,480 | 1/1982 | Armanini et al. | 106/291 |
| 4,435,220 | 3/1984 | Watanabe et al. | 106/291 |

*Primary Examiner*—Paul Lieberman
*Assistant Examiner*—Willie Thompson
*Attorney, Agent, or Firm*—Millen & White

[57] ABSTRACT

A dispersible Berlin blue pigment comprises Berlin blue deposited on to mica platelets. The pigment is additionally coated with a first coat of basic aluminum sulfate and a second coat of a mixture of a metal hydroxide with a polysiloxane or a fatty acid.

17 Claims, No Drawings

DISPERSIBLE BERLIN BLUE PIGMENT

BACKGROUND OF THE INVENTION

The invention relates to a dispersible Berlin blue pigment wherein Berlin Blue has been deposited on to mica platelets.

It is known that the poor dispersibility of pulverulent Berlin blue pigments can be improved by fixing the Berlin blue pigment on mica platelets in the form of a thin film. Such pigments, which are described, for example, in Patents DE No. 2,313,332, U.S. Pat. No. 4,047,969 and U.S. Pat. No. 4,309,480, consist of mica platelets treated with insoluble Berlin blue. Fixed on the mica surface, the pigment particles are prevented from agglomerating into major aggregates which would have to be split up again during dispersion. And indeed such pigments are readily dispersed in water. The dispersibility in organic media, however, is as unsatisfactory as before.

SUMMARY OF THE INVENTION

It is therefore an object of this invention to develop Berlin blue pigments which are readily dispersed not only in aqueous formulations but also in organic formulations.

Upon further study of the specification and appended claims, further objects and advantages of this invention will become apparent to those skilled in the art.

These objects have been achieved by coating the known pigments with an additional coating which is applied in two stages and which confers partial hydrophobicity to the pigments.

The invention accordingly provides a dispersible Berlin blue pigment wherein the Berlin blue has been deposited on to mica platelets, characterized in that the pigment has been additionally coated with a first coat of basic aluminum sulfate and a second coat of a mixture of a metal hydroxide with a polysiloxane or a fatty acid.

The invention also provides a process for preparing a dispersible Berlin blue pigment wherein mica in aqueous suspension is treated with a solution of a cyanoferrate and of an iron salt and is then oxidized if necessary, and the resulting mica pigment coated with Berlin blue is separated off, washed and dried, characterized in that after it has been coated with Berlin blue, the suspension has added to it first of all an aluminum salt, a sulfate and a base and then, simultaneously, a solution of a metal salt forming a sparingly soluble hydroxide and a solution of a polysiloxane or a solution of an alkali metal salt of a fatty acid, and the pigment is then separated off, washed and dried.

The invention finally also provides for the use of such a pigment in the production of preparations containing organic media.

DETAILED DISCUSSION

Surprisingly, the invention's improved dispersibility in organic media is not at the expense of the dispersibility in aqueous formulations. It is also found, surprisingly, that, as an effect of the additional coating according to the invention, the pigments have a deeper surface color.

The preparation of the pigments according to the invention is analogous to that of the known processes described in, for example, German Pat. No. 2,313,332 and U.S. Pat. Nos. 4,047,969 and 4,309,480. In these processes, mica platelets having a size of about 1 to 200 μm and a thickness of about 0.1 to 5 μm are suspended in water, to which is added, at a suitable pH, for example pH 3-9, a iron salt solution and hexacyanoferrate solution, in succession or simultaneously. One option is first of all to precipitate a coat of a sparingly soluble iron(II) or iron(III) salt or hydrated oxide, which is then directly converted into Berlin blue with a hexacyanoferrate(II) or hexacyanoferrate(III) or initially into colorless iron(II) hexacyanoferrate(II) which is then oxidized to Berlin blue. Or, if the iron salt and the hexacyanoferrate solution are added simultaneously, it is also possible for Berlin blue or iron(II) hexacyanoferrate(II) to be deposited directly, to be followed again, in the latter case, by an oxidation to Berlin blue. If desired, the precipitation can be effected with an excess of iron salt, as in U.S. Pat. No. 4,047,969, or in the presence of an aluminum salt, as in U.S. Pat. No. 4,309,480. The starting material need not be mica, but can also be mica platelets coated with metal oxides, in particular $TiO_2$. All these processes are described in said patents and the literature referred to therein and are used in the same way in the process according to the invention. The resulting pigments generally have a Berlin blue content of about 4 to 50, preferably about 20 to 40, % by weight.

In the process according to the invention, these pigments are coated first of all with a thin film of basic aluminum sulfate. To this end, the pigment suspension is brought to about pH 3-8 and has added to it a solution of an aluminum salt and a solution of a sulfate while the pH of the suspension is kept at a constant value by adding a base. In a preferred procedure, which gives a particularly homogeneous precipitation, the aluminum salt and sulfate are added to the acid pigment suspension, producing no precipitate at that stage, and inducing the precipitation by addition of urea and its hydrolysis at elevated temperatures. In this way, about 0.01 to 2, preferably about 0.1 to 1, % by weight of basic aluminum sulfate, relative to the aluminum contained therein and relative to the total pigment weight, are applied. The concentrations of the aluminum and sulfate throughout can be conventionally chosen to achieve these amounts in the pigments.

The coating with the basic aluminum sulfate alone is sufficient to produce an appreciable improvement in the dispersibility. However, an additional effect can be produced by means of a second coating with a polysiloxane and a metal hydroxide or a fatty acid and a metal hydroxide.

To apply the coating incorporating the polysiloxane and a metal hydroxide, the pigment suspension is brought to about pH 2-7 and has added to it a solution of a polysiloxane and a solution of a metal salt forming a sparingly soluble hydroxide.

The polysiloxane can be in particular a polyorganosiloxane, such as, for example, a polyether-siloxane. The latter is a block copolymer composed of a linear or branched polysiloxane block, for example a polydimethylsiloxane, and one or more polyether blocks. See U.S. application Ser. No. 653,127 filed on 9-21-84 and which disclosure is incorporated by reference herein.

For the purpose of this invention, polysiloxanes, accordingly, are branched block copolymers consisting of polysiloxane segments of the type

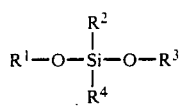

where $R^1$ and $R^3$ are independently each

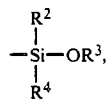

H, $C_{1-4}$-alkyl or polyether, and $R^2$ and $R^4$ are each

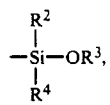

$C_{1-4}$-alkyl or polyether, e.g., poly($C_{1-4}$-alkylene)ethers throughout. The polymers have a viscosity at 25° C. of about 20–20,000 mm²·sec⁻¹ and molecular weights of about 500 to 5,000, and they are water- and oil-soluble, owing to the ratio of branched to unbranched alkyl chains in the polyether sequences of, for example, 50% ethylene oxide to 50% propylene oxide. They can easily be precipitated from aqueous solutions by partial hydrolysis as a result of raising the temperature or as a result of adjusting the solution to an acid or strongly alkaline pH. See e.g. Edwin P. Plueddemann: Silane Coupling Agents, Plenum Press, N.Y. 1982.

The polyether side chain attached to the polysiloxane skeleton like the teeth on a comb are at least partially split off by hydrolysis under the reaction conditions, leaving sites on the polysiloxane skeleton for coordination with the coprecipitated metal hydroxide.

The polysiloxane is used in the form of an approximately 2 to approximately 20% by weight solution or emulsion. The amount of solution added to the pigment suspension is proportioned in such a way that the polysiloxane contained in the solution amounts to about 0.1 to about 40% by weight of the pigment. It must be taken into account that not all the siloxane is precipitated on the pigment but that some remains in solution. The coated pigment, therefore, generally contains about 0.01 to about 5, in particular about 0.1 to 2, % by weight, relative to $SiO_2$ and relative to the total pigment weight.

Suitable for use as simultaneous precipitation metal hydroxides are the hydroxides of the alkaline earth metals and of aluminum, tin, zinc, iron, cobalt and chromium. Aluminum and zinc are particularly preferred. It is essential that the solution of the metal salts which form these hydroxides is added to the pigment suspension at the same time as the polysiloxane solution is added, in order for homogenous mixing to take place. The metal hydroxides are generally precipitated in levels of about 0.1 to 5% by weight, preferably about 0.5 to 3% by weight.

If the second additional coating takes the form of a coating with fatty acid plus metal hydroxide, the pigment suspension is brought to about pH 3–7 and has added to it a solution of an alkali metal salt of a fatty acid, in particular of a monobasic, saturated or unsaturated carboxylic acid of 4 to 30, preferably 10 to 20, carbon atoms. The approximately 0.5 to approximately 5% by weight solution is added in such an amount that the fatty acid in question is present in the finished pigment in an amount of 0.01 to 2, preferably about 0.1 to 1, % by weight.

In this case too, a metal hydroxide is made to coprecipitate with the other component, here a fatty acid, and it is likewise essential that the fatty acid and the metal salt forming a sparingly soluble hydroxide are added simultaneously. The pigment surface in this variant of the process sees in the main the formation of the corresponding metal soaps. The nature and the amount of the metal hydroxides are chosen in the same way as in the case of the additional coating with siloxane. Suitable acids are e.g. caproic acid, caprylic acid, capric acid, lauric acid, myristic acid, palmitic acid, stearic acid, oleic acid, linoleic acid or mixtures thereof.

A further surprising advantage of the pigments of the invention results from relatively high contents of basic aluminum sulfate and of metal hydroxide plus fatty acid. It is known that Berlin blue pigments show a dependency of the surface color on the remaining water content of the sample. This makes itself felt in that with an increasing drying time both a color shift to a tinge of red and a reduction in brightness occurs.

It has now been found that this effect can be diminished when the pigments are furnished with a relatively high content of the after-coatings. The content of basic aluminum sulfate should in this case be about 0.5–20, preferably 5–10, % by weight, relative to the total pigment weight. To reach this effect the metal hydroxide which is used for the second after-coating is precipitated in amounts of from about 0.1–5, preferably of from 0.5–3, % by weight and the fatty acid in amounts of from about 0.1–5, preferably of from 0.5–2, % by weight, in each case related to the total weight of the finished pigment.

When the coating operations are complete, the pigment suspension may in each case by stirred for a while longer, and the pigments are then conventionally separated off and, if desired, additionally washed and dried. Thereafter the pigments can be used for any intended purpose, such as, for example, in cosmetics, but also in the pigmenting of plastic paints and inks. Because of the markedly improved dispersibility in organic media, the use in preparations containing these media is in fact preferred.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A solution of 80 g of $FeSO_4 \times 7H_2O$ and 3.2 ml of concentrated sulfuric acid in 800 ml of water and a solution of 107.4 g of $K_4[Fe(CN)_6] \times 3H_2O$ in 800 ml of water are added simultaneously at 70° C. and pH 5.0 to a suspension of 160 g of mica having a particle size of about 1 to 15 μm in 2,240 ml of water in the course of 270 minutes, during which the pH of the suspension is held substantially constant by the simultaneous addition of 5% sodium hydroxide solution. The pH is then adjusted to 3.0 with 10% hydrochloric acid, and an oxidation is carried out at 70° C. for 105 minutes by adding 4.2 g of KClO$_3$.

To the Berlin blue pigment suspension thus obtained is added 28.8 g of urea, 6.4 g of AlCl$_3 \times$6H$_2$O, 38.4 g of NH$_4$Cl and 3.2 g (NH$_4$)$_2$SO$_4$, and the mixture is heated at 97° C. for 2.5 hours. After cooling down to 60° C. it is brought to a pH of 5.0 with concentrated hydrochloric acid, and a solution of 20 g of polysiloxanepolyether copolymer (Siloxan Tego 281 supplied by the firm of Goldschmidt AG) in 200 ml of water and a solution of 5.6 g AlCl$_3 \times$6H$_2$O in 200 ml of water was added simultaneously in the course of 21 minutes, during which the pH is held substantially constant by the addition of 1% sodium hydroxide solution. When the mixture has been stirred for 3 hours the product is separated off, washed with water and dried at 120° C.

EXAMPLE 2

A suspension in 900 ml of water of 105 g of a pigment prepared in accordance with Example 4 of U.S. Pat. No. 4,309,480 and having a particle size of 1 to 15 µm and a Berlin blue content of 5.7% by weight is coated with basic aluminium sulfate analogously to Example 1, using 18 g of urea, 4 g of AlCl$_3 \times$6H$_2$O, 24 g of NH$_4$Cl and 2 g of (NH$_4$)$_2$SO$_4$.

When the suspension has cooled down to 60° C. it is brought to a pH of 5.0 with concentrated hydrochloric acid, and a solution of 4 g of Siloxan Tego 281 and 4.75 g of AlCl$_3 \times$6H$_2$O in 250 ml of water is added dropwise in the course of 27 minutes, during which the pH is held substantially constant by the simultaneous addition of 1% sodium hydroxide solution. When the mixture has been stirred for 1.5 hours the product is separated off, washed with 8 liters of water and dried at 120° C.

EXAMPLE 3

A suspension in 600 ml of water of 50 g of a Berlin blue pigment prepared in accordance with Example 8 of German Offenlegungsschrift No. 2,313,332 and having a particle size of 1 to 15 µm and a Berlin blue content of about 31% by weight is coated with basic aluminum sulfate analogously to Example 1, using 9 g of urea, 2 g of AlCl$_3 \times$6H$_2$O, 12 g of NH$_4$Cl and 1 g of (NH$_4$)$_2$SO$_4$. When the suspension has cooled down to 60° C., it is additionally coated analogously to Example 2 using 2 g of Siloxan Tego 281 and 2.4 g of AlCl$_3 \times$6H$_2$O.

EXAMPLE 4

A suspension in 200 ml of water of 13 g of a Berlin blue pigment having a particle size of 1 to 15 µm and having been prepared analogously to Example 1 using 9 g of mica, 4.5 g of FeSO$_4 \times$7H$_2$O, 0.2 ml of concentrated sulfuric acid and 6 g of K$_4$[Fe(CN)$_6$]$\times$3H$_2$O is coated with basic aluminum sulfate likewise analogously to Example 1 using 1.6 g of urea, 0.4 g of AlCl$_3 \times$6H$_2$O, 2.2 g of NH$_4$Cl and 0.2 g of (NH$_4$)$_2$SO$_2$. When the suspension has cooled down to 60° C. it is brought to pH 7.0 with 2% ammonia solution, and a solution of 0.4 g of Siloxan Tego 281 in 50 ml of water and a solution of 0.58 g of ZnSO$_4 \times$7H$_2$O in 50 ml of water are simultaneously added dropwise in the course of 16 minutes, during which the pH is held substantially constant by the simultaneous addition of 2% ammonia solution. When the mixture has been stirred for 45 minutes the product is separated off, washed and dried at 120° C.

EXAMPLE 5

A suspension in 850 ml of water of 50 g of a Berlin blue pigment having a particle size of 1 to 15 µm and having been prepared analogously to Example 1 using 34.5 g of mica, 17.25 g of FeSO$_4 \times$7H$_2$O, 0.7 ml of concentrated sulfuric acid and 23.2 g of K$_4$[FE(Cn)$_6$] is coated with basic aluminum sulfate likewise analogously to Example 1 using 6.2 g of urea, 1.4 g of AlCl$_3 \times$6H$_2$O, 8.3 g of NH$_4$Cl and 0.7 g of (NH$_4$)$_2$SO$_4$. The suspension is then brought to a pH of 5.0 with 10% hydrochloric acid, and a solution of 1.9 g of AlCl$_3 \times$6-H$_2$O in 100 ml of water and a solution of 0.5 g of a mixture of the sodium salts of C$_{14}$–C$_{18}$(fatty) acids (Edenor SJ supplied by the firm of Henkel) in 100 ml of water are added dropwise in the course of 20 minutes, during which the pH is held substantially constant by the simultaneous addition of dilute hydrochloric acid. When the mixture has been stirred for 1 hour the product is separated off, washed and dried at 120° C.

EXAMPLE 6

(a) A solution of 140 g of FeCl$_3$.6H$_2$O in 3720 ml of water and a solution of 218.8 g of K$_4$[Fe(CN)$_6$].3H$_2$O in 3270 ml of water are added simultaneously at room temperature and pH 5.0 to a suspension of 750 g of mica having a particle size of about 1 to 15° µm in 4.47 l of water in course of 12 hours, during which the pH of the suspension is held substantially constant by the simultaneous addition of 2% ammonia solution.

(b) To 1444 ml of the thus obtained Berlin blue suspension (contains 100 g of pigment) is added 600 ml water, 36 g urea, 48.2 g NH$_4$Cl and 1.8 g (NH$_4$)$_2$SO$_4$, and the mixture is heated at 98° C.

At this temperature a solution of 8 g AlCl$_3$.6H$_2$O in 300 ml of water is so measured to that the pH does not decrease beyond 5.0. After cooling down to 70° C. a pH of 5.0 is adjusted and a solution of 1.4 g sodium stearate in 300 ml of water and a solution of 6 g AlCl$_3$.6H$_2$O in 300 ml of water is added simultaneously in the course of 90 minutes, during which the pH is held substantially constant by the addition of diluted ammonia solution. When the mixture has been stirred for 1 hour the product is separated off, washed with water and dried at 110° C.

COMPARISON EXAMPLE

A Berlin blue pigment prepared according to Example 6(a) is separated off without a following after-coating, washed with water and dried at 110° C.

In comparison to this pigment a pigment which is after-coated according to Example 6(b) exhibits an improved dispersability and a softer feeling when it is applied to the skin. Additionally, the color values of the after-coated pigment in comparison to the non-coated pigment, which values are measured with a color meter (Hunterlab) using the pigment powder, prove both the higher color strength of the aftercoated and the diminished reduction in brightness of this sample in the course of the drying.

In the following table the L,a,b-values according to DIN 5033 in dependency of the drying time are compiled.

| | Pigment without after-coating | | | Pigment with after-coating | | |
|---|---|---|---|---|---|---|
| drying time | L | a | b | L | a | b |
| 3 hours | 23.9 | +3.8 | −19.0 | 18.0 | +5.8 | −21.3 |
| 15 hours | 22.0 | +4.1 | −16.6 | 18.4 | +5.4 | −20.2 |
| 56 hours | 21.0 | +3.9 | −13.1 | 17.5 | +6.1 | −17.7 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A dispersible Berlin blue pigment comprising mica platelets having a coating of Berlin blue thereon, further comprising a first coating of basic aluminum sulfate, and on the coating of basic aluminum sulfate, a second coating of a mixture of a hydroxide of an alkaline earth metal, aluminum, tin, zinc, iron, cobalt or chromium, and a fatty acid of 4–30 carbon atoms or a polysiloxane of the formula:

$$R^1-O-\underset{\underset{R^4}{|}}{\overset{\overset{R^2}{|}}{Si}}-O-R^3$$

where $R^1$ and $R^3$ are independently each $$-\underset{\underset{R^4}{|}}{\overset{\overset{R^2}{|}}{Si}}-OR^3,$$

H, $C_{1-4}$-alkyl or poly-($C_{1-4}$-alkylene)ether, and $R^2$ and $R^4$ are each $$-\underset{\underset{R^4}{|}}{\overset{\overset{R^2}{|}}{Si}}-OR^3,$$

$C_{1-4}$-alkyl or poly($C_{1-4}$-alkylene)ether.

2. A pigment of claim 1, wherein said metal hydroxide is aluminum or zinc hydroxide.

3. A pigment of claim 1, wherein the total weights of the aluminum sulfate layer and said coating thereon comprise about 0.1 to about 12% by weight of the total pigment.

4. A pigment of claim 1, wherein the top layer comprises a monobasic fatty acid of 10 to 20 carbon atoms.

5. A pigment of claim 1 wherein the weight of the aluminum sulfate layer in terms of aluminum and based on the total pigment weight is about 0.01 to about 2 wt %.

6. A pigment of claim 1 wherein the weight of the aluminum sulfate layer in terms of aluminum and based on the total pigment weight is about 0.5 to 20 wt %.

7. A pigment of claim 1 wherein the top layer comprises about 0.01 to about 5 wt % of polysiloxane relative to total pigment weight.

8. A pigment of claim 1 wherein the top layer comprises about 0.01 to about 2 wt % of fatty acid related to total pigment weight.

9. A pigment of claim 1 wherein the top layer comprises about 0.1 to about 5 wt % of fatty acid related to total pigment weight.

10. A pigment of claim 1 wherein the amount of the metal hydroxide is 0.1 to 5% by weight based on the total pigment weight.

11. A process for preparing a dispersible Berlin blue pigment comprising suspending a mica pigment coated with Berlin blue, and adding to the suspension an aluminum salt, a sulfate and a base at a pH of 3–8, whereby there is precipitated on the pigment a layer of aluminum sulfate, and thereafter simultaneously adding to the suspension a solution of a metal salt forming a sparingly soluble hydroxide and a solution of a polysiloxane or a solution of an alkali metal salt of a fatty acid, and then separating the pigment.

12. A process of claim 11 further comprising washing and drying the pigment.

13. A process of claim 11 wherein the base added with the aluminum salt is urea.

14. A process of claim 11 wherein the metal salt forming the sparingly soluble hydroxide is an aluminum or zinc salt.

15. A process of claim 11 wherein the fatty acid is a monobasic carboxylic acid of 10 to 20 carbon atoms.

16. In a formulation comprising a base ingredient and a pigment, the improvement wherein the pigment is that of claim 1.

17. A formulation of claim 16 wherein the pigment is dispersed in an organic medium.

* * * * *